United States Patent [19]
Butzen

[11] Patent Number: 5,738,480
[45] Date of Patent: Apr. 14, 1998

[54] TWO-WHEELED DOLLY FOR MOVING HEAVY OBJECTS

[76] Inventor: Michael J. Butzen, 5311 County J, Sheboygan, Wis. 53083

[21] Appl. No.: 632,766

[22] Filed: Apr. 15, 1996

[51] Int. Cl.⁶ .................................................. B62B 1/14
[52] U.S. Cl. .............................. 414/490; 280/47.29
[58] Field of Search .................... 414/490; 410/97, 410/100; 280/47.19, 47.27, 47.28, 47.29

[56] References Cited

U.S. PATENT DOCUMENTS

| | | | |
|---|---|---|---|
| 2,516,260 | 7/1950 | Schildmeier | 280/47.28 X |
| 2,598,489 | 5/1952 | Bayer et al. | 280/47.28 X |
| 3,120,370 | 2/1964 | Sause, Jr. | 410/100 |
| 3,907,138 | 9/1975 | Rhodes | 414/490 X |
| 4,257,729 | 3/1981 | Morissette | 414/490 |
| 4,281,957 | 8/1981 | Vishe et al. | 414/490 X |
| 4,487,537 | 12/1984 | Morse | 410/100 X |
| 4,515,233 | 5/1985 | Silverstein | 410/100 X |
| 4,741,659 | 5/1988 | Berg | 414/490 X |
| 5,122,027 | 6/1992 | Tabayashi | 414/490 X |
| 5,489,183 | 2/1996 | Malden et al. | 414/490 |
| 5,575,605 | 11/1996 | Fisher | 414/490 |

FOREIGN PATENT DOCUMENTS 608651  9/1948  United Kingdom ............. 280/47.27

*Primary Examiner*—David A. Bucci
*Attorney, Agent, or Firm*—R. Jonathan Peters

[57] ABSTRACT

A hand truck or dolly is shown which includes a frame pivotable on a pair of wheels. The frame includes a foot plate and a slidable bracket on which a heavy item to be carried can be mounted. The support can be raised by a screw operated by a hand crank or power-assisted elevator, while one end of the screw is fastened to the foot plate.

9 Claims, 4 Drawing Sheets

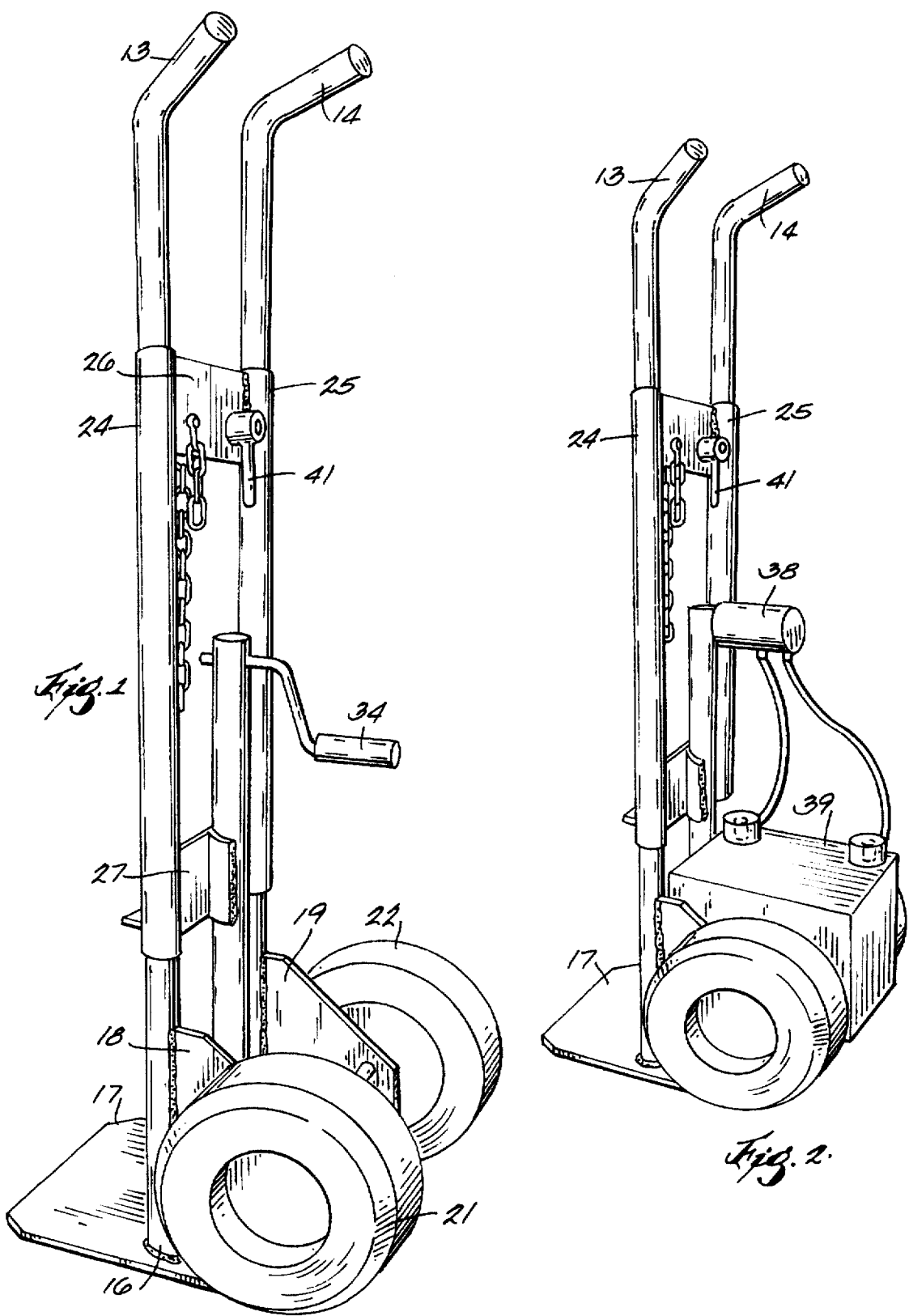

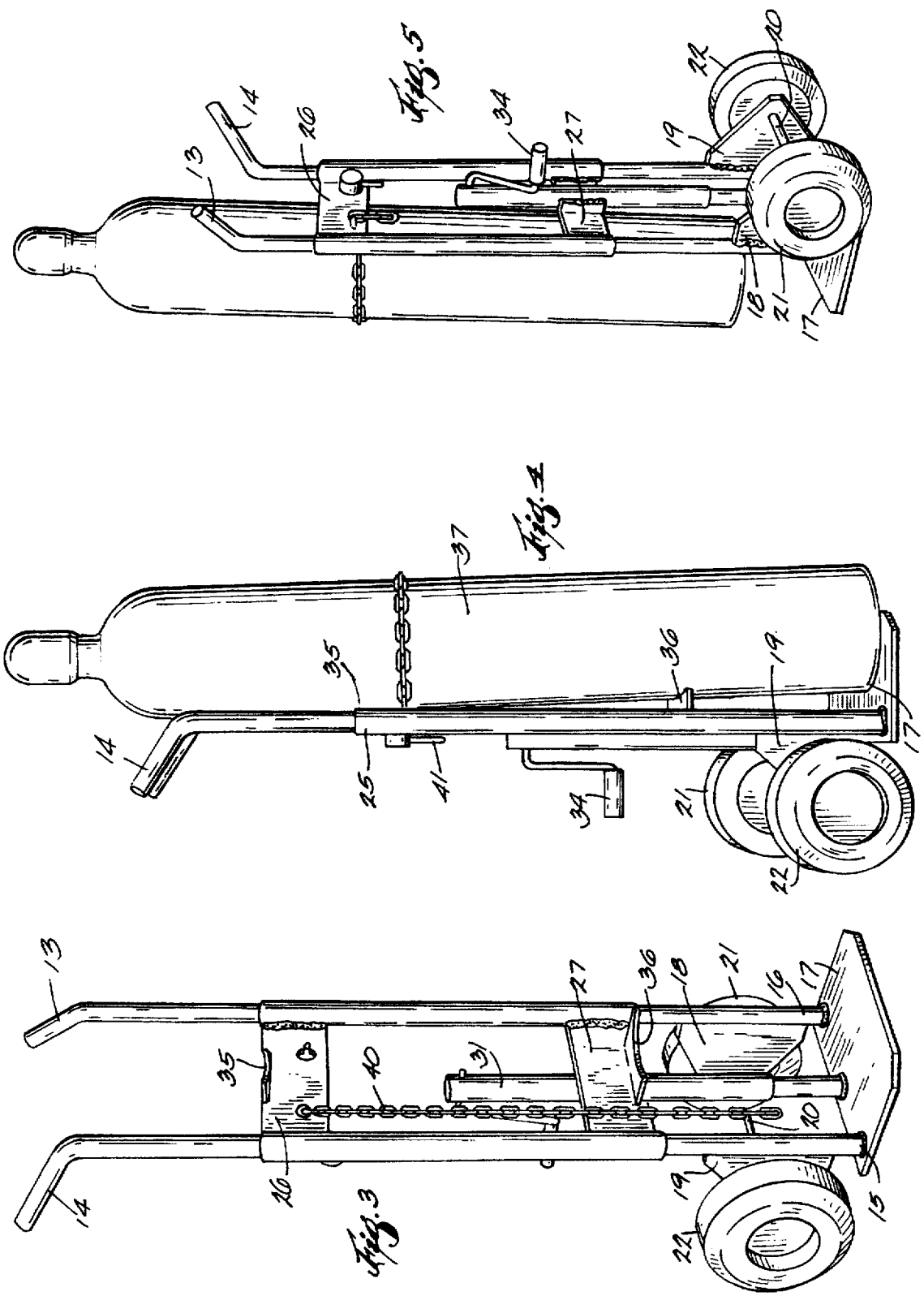

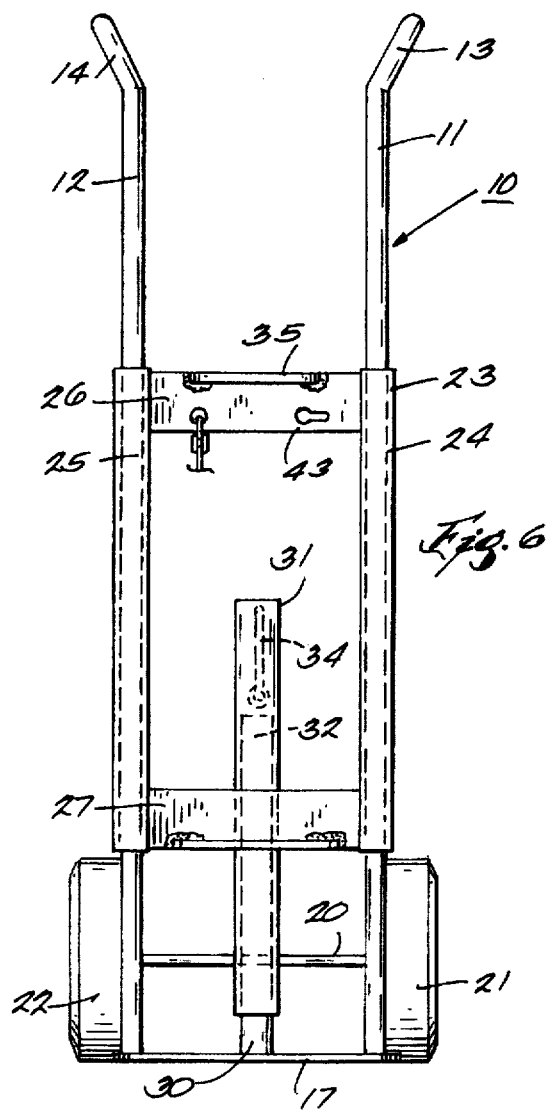
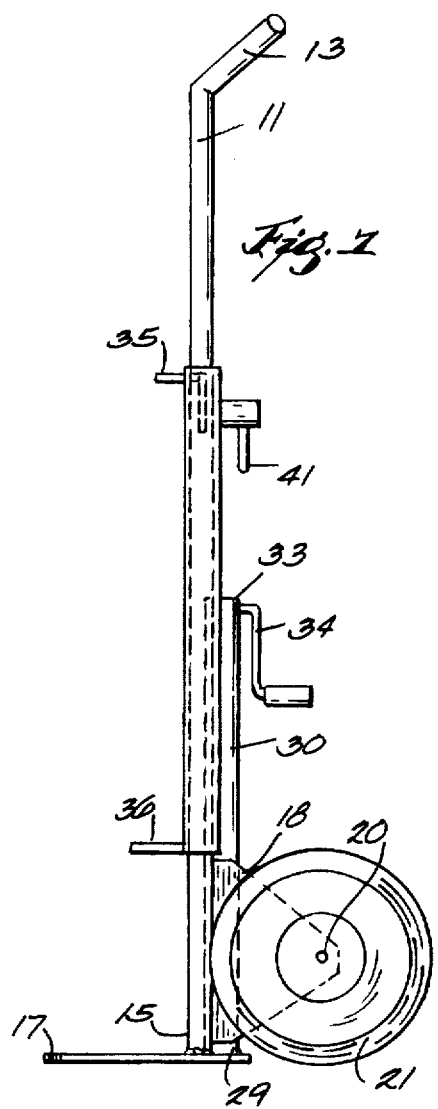
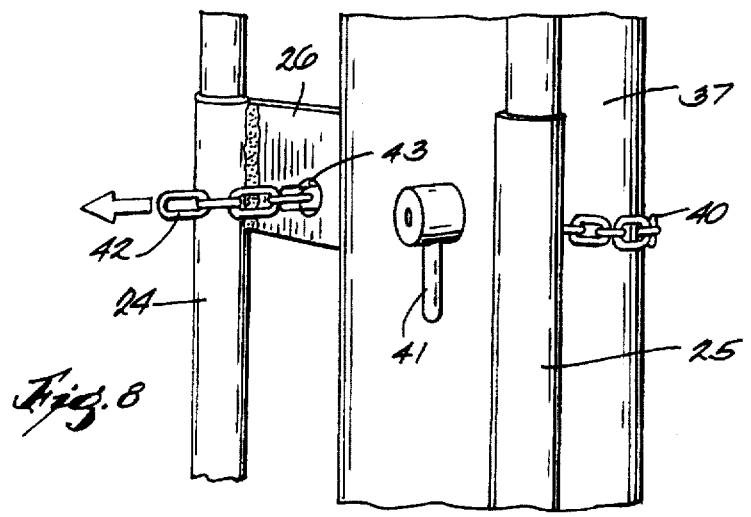

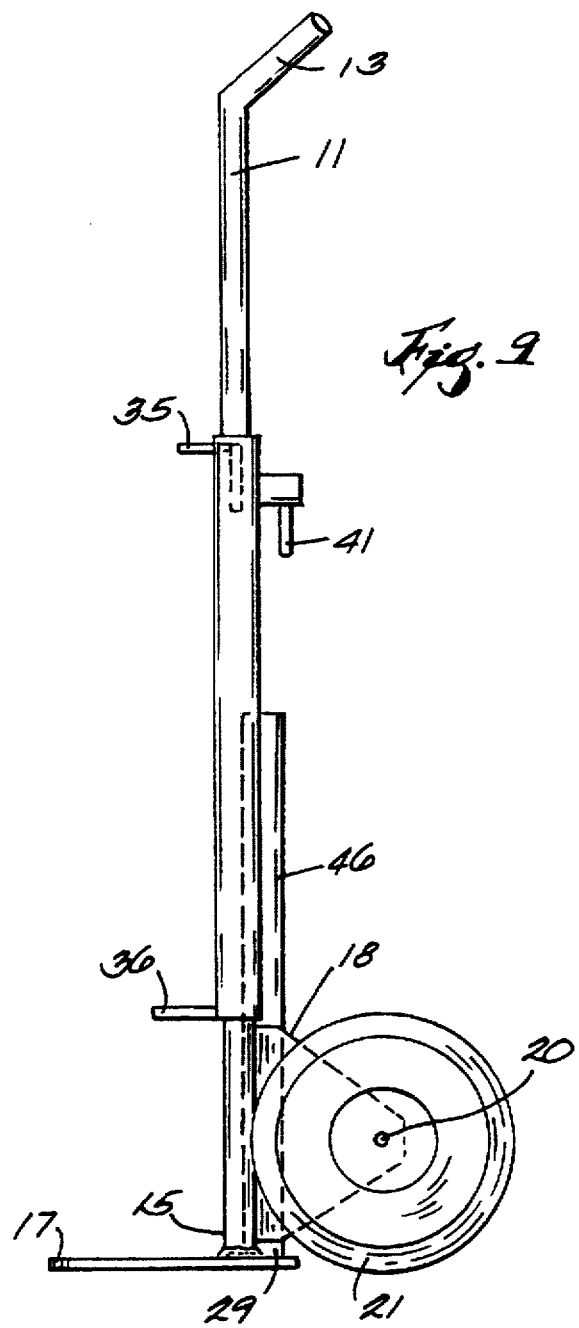

TWO-WHEELED DOLLY FOR MOVING HEAVY OBJECTS

BACKGROUND OF THE INVENTION

The device of the present invention is generally described as a dolly or a hand truck, or a roll cart. Some of these hand trucks may be multi-purpose, and have more than two wheels, but the majority of them are strong, metal frames with a pair of wheels at one end positioned off-centered from the frame of the truck or dolly, so that when a heavy load is placed upon the platform portion of the truck, the frame can be tilted to lift the load off the floor and above the axle of the wheels so that a heavy object may be moved relatively easily.

Such dollies or trucks come in a variety of sizes and shapes, so as to handle a great variety of heavy objects.

If the objects become too heavy or unwieldly or cumbersome, equipment for handling such objects is a forklift truck or similar heavy-duty, mechanical equipment.

However, the devices of the prior art of hand trucks do not include arrangements for elevating the material to be lifted along the frame of the truck or dolly, and when such objects become heavy (200 pounds or more in weight), there is an incipient danger to the health of the operator, even though the truck or dolly is devised and designed to eliminate as much lifting as possible.

Therefore, it is an object of the present invention to provide a two-wheeled truck or dolly which includes an elevator mechanism to raise the object to be lifted along the frame of the dolly.

Another object of the present invention is to provide such a dolly with movable frame where the adjustment of the frame can be done, either manually, as with a crank, or electrically, as with a motor-driven attachment.

Still a further object of the present invention is to provide a hand truck, which is particularly suitable for lifting the standard heavy (250 pound) cylinder containing gases such as oxygen, nitrogen, acytelene and the like, when such gases are used in a metal fabricating factory.

BRIEF DESCRIPTION OF THE INVENTION

In the present invention a hand truck, which includes a generally rectangular frame with a pair of wheels mounted at one end and offset from the plane of the frame, includes a bracket which is slidably mounted on the frame of the hand truck. At the bottom of the frame, a foot plate extends at right angle to the frame. Although the bracket can move on the frame, the foot plate remains fixed at the bottom of the frame as the bracket is adjusted.

Additionally, a pair of cradles is mounted on the bracket, against which a gas-cylinder can rest while the bottom of the gas cylinder is resting on the foot plate attached to the frame.

A belt or chain-type arrangement is provided on the bracket which enables the user to tightly secure the cylinder against the cradles when it is desired to move the bracket along the frame so as to elevate the cylinder.

Securely mounted to the foot plate at the bottom of the frame is one end of an elevator, such as a screw and worm gear arrangement, which has another portion thereof connected to the bracket, and which, when operated causes the bracket to move along the frame.

In one version of the preferred embodiment, the screw arrangement may be powered by a manually-operated crank, and in another version the screw arrangement may be powered by an electric motor, which is connected to a battery carried on a suitable arrangement between the wheels of the dolly.

With the above and other objects in view, further information and a better understanding of the present invention may be achieved by referring to the following detailed description:

BRIEF DESCRIPTION OF THE DRAWINGS

For the purpose of illustrating the invention, there is shown in the accompanying drawings a form thereof which is at present preferred, although it is to be understood that the various instrumentalities of which the invention consists can be variously arranged and organized, and that the invention is not limited to the precise arrangement and organizations of the instrumentalities as herein shown and described.

In the drawings, wherein like reference characters indicate like parts:

FIG. 1 is a perspective view of the hand truck of the present invention viewed from the left-wheel side, with a manually-operated screw arrangement.

FIG. 2 is a perspective view similar to that of FIG. 1 illustrating how the screw arrangement can be operated by a small electric motor, powered by a battery carried between the wheels of the dolly.

FIG. 3 is a perspective view, viewed generally at 180 degrees from the views of FIGS. 1 and 2, and showing particularly the foot plate, the cradles, and the cylinder-tightening belt or chain arrangement.

FIG. 4 is a side view of the hand trucks of FIGS. 1 and 3 showing how an oxygen cylinder is mounted on the foot plate and secured by the belt or chain arrangement.

FIG. 5 is a view similar to FIG. 1 and 4 showing how the cylinder is elevated above the foot plate when the manually-operated hand crank actuates the elevator arrangement.

FIG. 6 is a front elevational view of the hand truck shown in the previous figures.

FIG. 7 is a side elevational view of the hand truck of FIG. 6.

FIG. 8 is a fragmentary perspective view showing the belt or chain tightening arrangement using a key hole slot and a screw-tightening device.

FIG. 9 is a side elevational view of a hand truck with an hydraulic piston arrangement.

DESCRIPTION OF THE PREFERRED EMBODIMENT

The hand truck 10 of the present invention includes a frame having a pair of parallel pipe-like members 11 and 12, which have handles 13 and 14 at the upper end, and which, at their lower ends 15 and 16, are secured to a foot plate 17 which extends generally at a right angle to the bottom of the pipes 11 and 12.

A pair of plates 18 and 19 are welded to the pipes 11 and 12 and extend away from the pipes in a direction opposite to that of the foot plate 17. These plates 18 and 19 support an axle 20 and a pair of wheels 21 and 22. This arrangement forms the frame of the hand truck.

Slidably mounted on the pipes 11 and 12 is a bracket 23 which is formed of a pair of tubular members 24 and 25 connected by cross members 26 and 27, thus forming a generally rectangular bracket which can move longitudinally along the pipes 11 and 12, upwardly away from and downwardly toward the foot plate 17, as indicated in the arrow 28 in FIG. 7.

A portion 29 of the foot plate 17 extends away from the bottoms 15 and 16 of the pipes 11 and 12 to form a base on which a elevator 30 can rest. The elevator 30 extends upwardly away from the base 29 parallel to and generally between the pipes 11 and 12, as is shown particularly in FIG. 6.

The elevator 30 includes a tube 31 which is securely welded at 32 to the member 27 of the bracket 23.

At the top 33 of the elevator 30 a screw (not shown) is placed within the tube 31 to engage a mating member on the crank 34 so that by turning the crank 34 the screw causes the tube 31, and thus the bracket 23, to move upwardly on the member 30.

The pitch of the screw arrangement is such that a very strong mechanical advantage is achieved, and a relatively small amount of energy is required to turn the crank 34 in order to lift the tube 31 and the bracket 23 away from the foot plate 17. Thus a heavy object placed on the foot plate 17 is easily elevated from it.

A pair of cradles 35 and 36 are mounted on the face of the bracket 23 against which the surface of a cylinder (such as an oxygen cylinder) 37 may rest when the base of the cylinder is on the foot plate 17.

As is shown in FIG. 2, a relatively small 12 volt motor 38 may replace the crank 34. That motor 38 may be powered by a 12 volt battery 39 with an appropriate switch (not shown) by which the bracket 23, along with any object held against the brackets 35 and 36, may be elevated.

It is to be understood that the movement of the bracket 23 may be by an hydraulic elevator 46 as well as by mechanical or electrical means.

In order to hold the cylinder 37 firmly against the bracket 23 in the cradles 35 and 36, a chain 40 is held, at one end, in the member 26, by a turn screw 41.

The other end 42 of the chain 40 passes through a key hole slot 43 in the member 26 and can be locked at an appropriate position along the link-length of the chain as is shown particularly in FIG. 8.

By turning the thumbscrew 41 after the appropriate link of the chain has been placed in a keyhole slot, the chain can be tightened so as firmly to hold the cylinder 37 in the cradles 35 and 36.

Thus it can be seen that when the hand truck as shown in FIG. 3 is used to carry a cylinder 37, the cylinder can be rolled on top of the foot plate 17 and against the bracket 23 so that the sides of the cylinder 37 rest in the cradles 35 and 36, as shown in FIG. 4.

Then the chain 40 can be wrapped around the cylinder with the free-end drawn through the keyhole slot 43 and the chain tightened by turning the thumbscrew 41 as shown particularly in FIGS. 4 and 5.

It will be noted that the bottom cradle 36 extends slightly farther away from the bracket 26 than does the upper cradle 35, and this causes a slight inclination of the tank 37 which makes it easier to handle when the assembly is moved from one place to another.

When the cylinder is mounted on the hand truck, as shown in FIG. 4, the hand crank 34 can be turned (or alternately the motor 38 operated) so that the screw arrangement of the member 30 and tube 31 can be actuated to elevate the tube 31, and thus to lift the cylinder above the footplate 17, all as shown in FIG. 5.

Once the cylinder is firmly fastened on the cradles 35 and 36, as shown in FIG. 4, and before elevating the cylinder, the hand truck can be operated in the customary manner by tilting the handles 13 and 14 so as to pivot around the axle 20, and thus the heavy object may be moved from one place to another.

After the cylinder is moved to its new, desired location (which may, for example, be adjacent a welding machine) and it is desired to remove the cylinder from the hand truck, the cylinder is elevated to the position shown in FIG. 5.

After the cylinder is properly placed on the machine, the crank 34 (or the motor 38) is operated so as to lower the cylinder from the position shown in FIG. 5 to the desired position (i.e. adjacent a welding machine).

Then the tension on the chain 40 can be relieved by reverse operation of the thumb screw 41 and the chain can then be removed from the keyhole slot 43. The foot plate 17 can then be moved away from beneath the cylinder, leaving the cylinder in place and permitting the hand truck to be used for another purpose.

It is furthermore to be understood that the present invention may be embodied in other specific forms without departing from the spirit or special attributes; and it is, therefore, desired that the present embodiments be considered in all respects as illustrative and, therefore, not restrictive, reference being made to the appended claims rather than to the foregoing description to indicate the scope of the invention.

Having thus described the invention, what is claimed as new and desired to protect by Letters Patent are the following:

1. In a hand truck having at least two wheels for moving heavy objects, comprising:

(a) a frame, (b) a foot plate extending transversely from said frame and secured thereto, (c) a bracket slideably mounted on said frame above said foot plate, said bracket having spaced apart crossmembers, (d) a cradle extending traversely from each of said crossmembers, each of said cradles having an arcuate recess, (e) an elevator having one end fastened to said bracket and the opposite end fastened to said foot plate, (f) operating means for actuating said elevator so as to raise said bracket above said foot plate.

2. The hand truck of claim 1 wherein said operating means includes a manually operated screw and crank.

3. The hand truck of claim 1 wherein said operating means includes an electrically operated motor.

4. The hand truck of claim 1 further including securing means having a hand-screw, chain and keyhole-slot arrangement.

5. The hand truck of claim 1 wherein said bracket includes at least two cross members, one of which is secured to said elevator.

6. The hand truck of claim 5 one of said cradles is secured to one of said cross members and the other said cradle is secured to the other of said cross members.

7. The hand truck of claim 6 wherein the cradle attached to the cross member which is not also attached to said elevator is smaller than the cradle which is attached to the cross member which is also attached to said elevator.

8. The hand truck of claim 1 wherein said foot plate includes a portion extending at a right angle from said frame on which said object may rest while attached to said bracket and while said hand truck is moved on said wheels.

9. The hand truck of claim 1 wherein said operating means is an hydraulic piston.

\* \* \* \* \*